(12) United States Patent
Swenson et al.

(10) Patent No.: US 6,253,978 B1
(45) Date of Patent: Jul. 3, 2001

(54) MOTORCYCLE SADDLEBAG LOCK

(75) Inventors: Dale Swenson, Wales; Forrest Barnes, Whitefish Bay; Norm Reynolds, Hales Corners, all of WI (US)

(73) Assignee: Harley-Davidson Motor Company, Milwaukee, WI (US)

( * ) Notice: Subject to any disclaimer, the term of this patent is extended or adjusted under 35 U.S.C. 154(b) by 0 days.

(21) Appl. No.: 09/364,086

(22) Filed: Jul. 30, 1999

(51) Int. Cl.$^7$ ...................................................... B62J 9/00
(52) U.S. Cl. ........................ 224/413; 224/235; 224/654; 224/659
(58) Field of Search ..................... 224/413, 645, 224/654, 659, 235, 430; 150/101, 112, 167; 190/108, 107; 70/63, 64, 67, 68, 69, 18, 58, 49; 24/166, 167, 413, 645, 654, 235, 430; 121/876

(56) References Cited

U.S. PATENT DOCUMENTS

| | | | |
|---|---|---|---|
| 765,798 | * | 7/1904 | Spaulding .............................. 24/167 |
| 870,032 | * | 11/1907 | Herzog .................................. 24/167 |
| 872,865 | * | 12/1907 | Verch .................................... 24/167 |
| 1,196,623 | * | 8/1916 | Wightman ............................. 24/167 |
| 2,861,316 | * | 11/1958 | Kirsten ................................... 24/167 |
| 3,875,771 | * | 4/1975 | Reisner ................................... 70/18 |
| 3,989,174 | * | 11/1976 | Norinsky ......................... 224/430 X |
| 4,345,703 | * | 8/1982 | Allen ................................ 224/430 X |
| 4,912,950 | * | 4/1990 | Crowle ................................... 70/58 |
| 5,050,713 | * | 9/1991 | Lee ....................................... 190/108 |

OTHER PUBLICATIONS

1995 Harley–Davidson Genuine Parts & Accessories—pp. 70, 74, 83 and 84.

* cited by examiner

Primary Examiner—Gregory M. Vidovich
Assistant Examiner—Maerena Brevard
(74) Attorney, Agent, or Firm—Michael Best & Friedrich LLP

(57) ABSTRACT

A motorcycle saddlebag lock that can be used to lock a soft saddlebag having a body, a lid coupled to the body, and a strap interconnecting the lid to the body. The lock is attached to the strap when in a strapped position to inhibit the strap from being moved to an unstrapped position. Preferably, the saddlebag includes a retaining member (e.g., a buckle) attached to the body to define an opening through which the strap is received when in the strapped position. In this embodiment, the retaining member is positioned between the lock and the lid, and the lock is larger than the retaining member to thereby prevent the strap from being pulled through the retaining member. The lock includes a body having an opening adapted to receive the strap, and an engaging member coupled to the body and movable relative to the body between an unlocked position out of the opening and a locked position in the opening. When in the locked position, the engaging member preferably is inserted into one of a plurality of holes in the strap. In one embodiment, the engaging member is coupled to a locking mechanism that allows movement of the engaging member only with the use of a key.

15 Claims, 3 Drawing Sheets

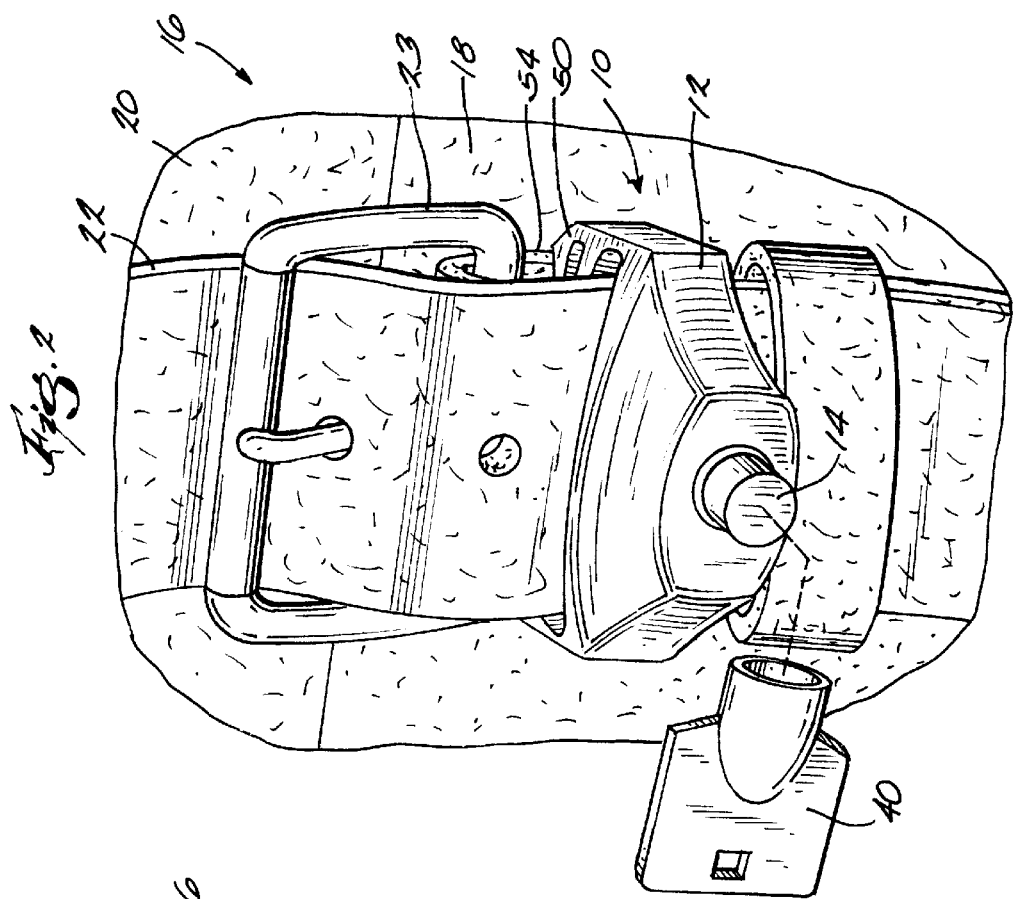
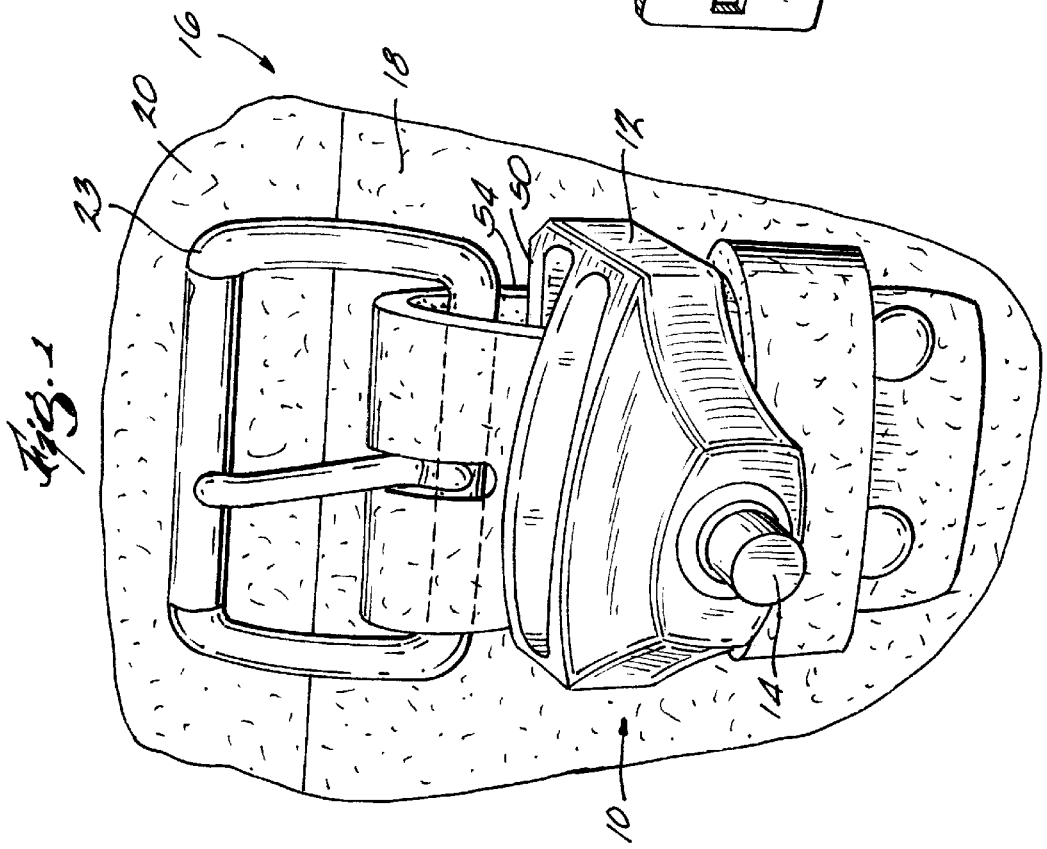

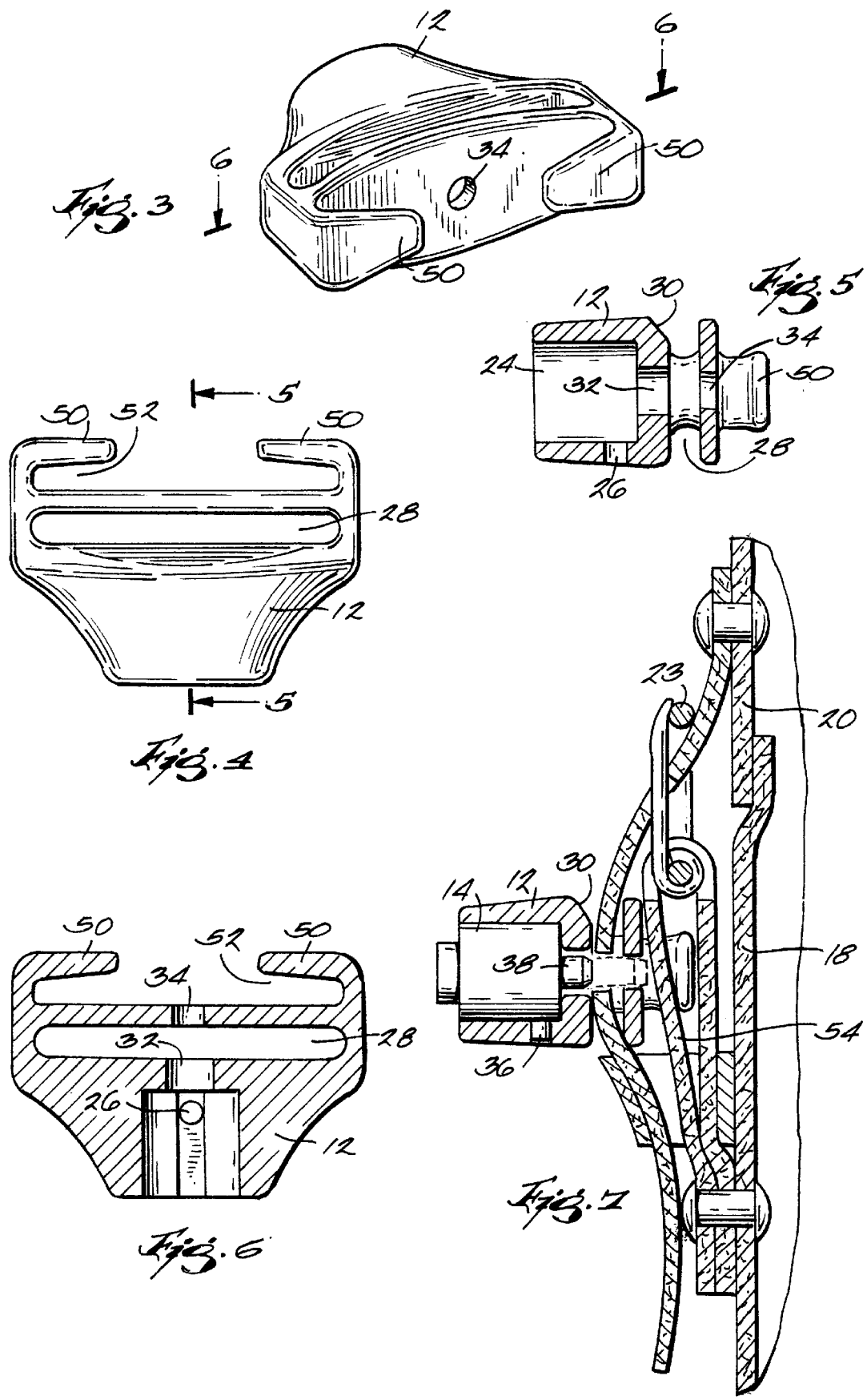

MOTORCYCLE SADDLEBAG LOCK

FIELD OF THE INVENTION

The present invention relates generally to motorcycle saddlebags. More specifically, the present invention relates to a lock that can be used to secure motorcycle saddlebags.

BACKGROUND OF THE INVENTION

Some motorcycles include bags, such as saddlebags, for storing items. Saddlebags are commonly mounted to the motorcycle on opposing sides of the passenger seat, near the rear wheel. Saddlebags are usually made of a body and a lid hinged to the body to facilitate access to the interior of the body.

Motorcycle saddlebags usually fall within one of two categories: hard or soft. Hard saddlebags have a relatively hard shell that protects the stored items. These saddlebags are usually made from plastic, fiberglass, or a similar material. Because the body and lid are made of a hard material, it is relatively easy to fit hard saddlebags with a lock that required a key to access the interior.

Soft saddlebags have been used for many years, and are commonly made from leather. These saddlebags typically have at least one strap and a corresponding buckle to allow the lid to be secured closed when access is not required. The strap and buckle are also desired from an aesthetic standard due to their classic look. One drawback from the soft saddlebag design is that it is difficult to provide such a saddlebag with a lock that limits access to the interior.

SUMMARY OF THE INVENTION

The present invention provides a motorcycle saddlebag lock that can be used to lock a soft saddlebag. More specifically, the present invention can be used to lock a saddlebag comprising a body having an opening, a saddlebag lid coupled to the body, and a strap interconnecting the lid to the body. The lock is attached to the strap when in a strapped position to inhibit the strap from being moved to an unstrapped position.

The strap can be attached to either the body or the lid, but is preferably attached to the lid. In addition, the saddlebag can further include a retaining member attached to the body to define an opening through which the strap is received when in the strapped position. In this embodiment, the retaining member is positioned between the lock and the lid, and the lock is larger than the retaining member to thereby prevent the strap from being pulled through the retaining member. In one embodiment, the retaining member comprises a buckle that is adapted to engage one of a plurality of holes in the strap.

The lock includes a body having an opening adapted to receive the strap, and an engaging member coupled to the body and movable relative to the body between an unlocked position out of the opening and a locked position in the opening. When in the locked position, the engaging member preferably is inserted into one of a plurality of holes in the strap. In one embodiment, the engaging member is coupled to a locking mechanism that allows movement of the engaging member only with the use of a key.

BRIEF DESCRIPTION OF THE DRAWINGS

FIG. 1 is a perspective view of a saddlebag lock mounted on a saddlebag without a closure strap inserted through the lock.

FIG. 2 is the perspective view of FIG. 1 with a closure strap inserted through the lock.

FIG. 3 is a perspective view of the saddlebag lock without a lock assembly.

FIG. 4 is a side view of the saddlebag lock illustrated in FIG. 3.

FIG. 5 is a section view taken along line 5—5 in FIG. 4.

FIG. 6 is a section view taken along line 6—6 in FIG. 3.

FIG. 7 is a section view of the saddlebag lock in a locked position and mounted on a saddlebag.

DETAILED DESCRIPTION

Figure 8:
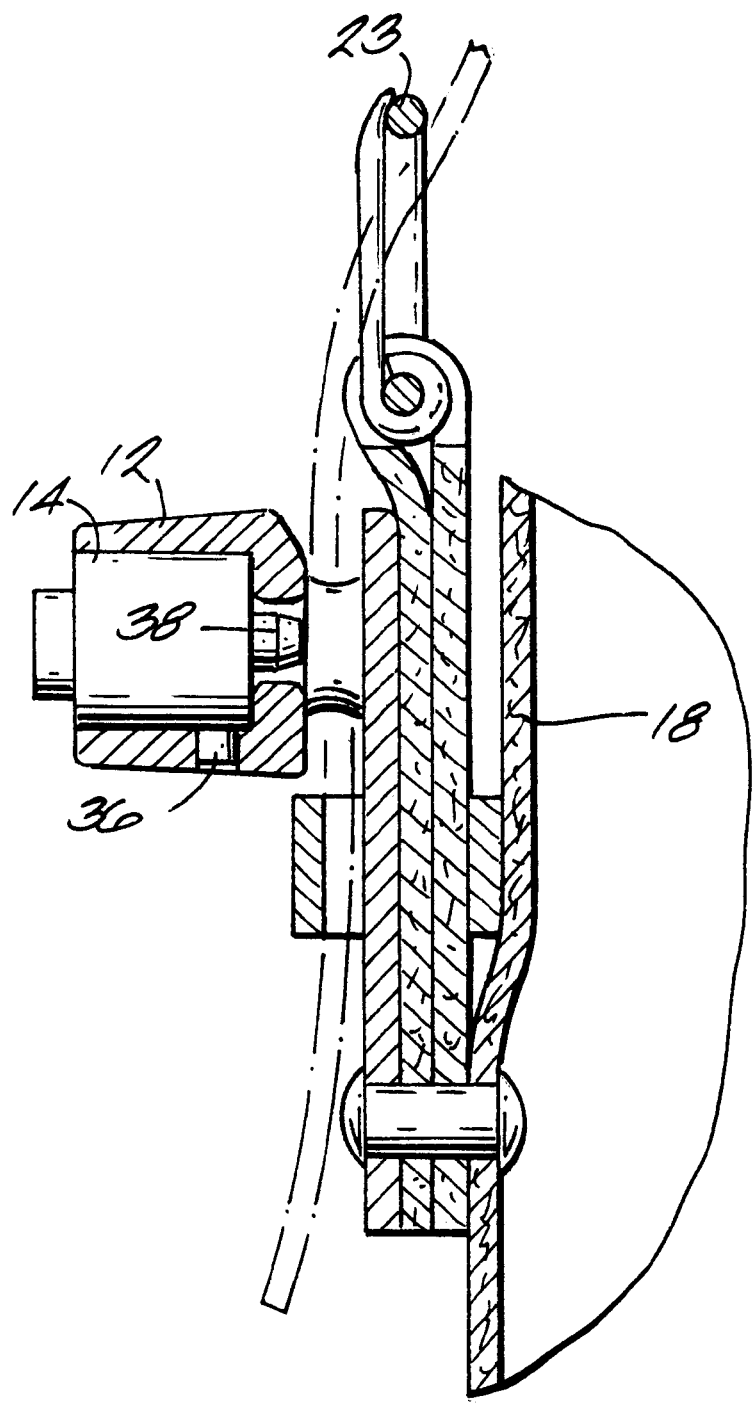
FIG. 8 is an alternative embodiment of the present invention mounted on a saddlebag.

The illustrated saddlebag lock 10 includes a base 12 and a lock assembly 14 positioned within the base 12. The lock assembly is designed to be coupled to a saddlebag 16 having a body 18, a lid 20, a strap 22, and a retainer member in the form of a buckle 23, as described below in more detail. As used herein, the terms "body" and "lid" refer to any two portions of a saddlebag that are movable relative to each other to allow access to the interior of the saddlebag.

Referring to FIGS. 3–6, the base 12 includes a recess 24 dimensioned to receive the lock assembly 14. A side opening 26 provides access to the recess 24 to facilitate securing the lock assembly 14 in the base 12, as described below in more detail. The base 12 further includes an opening in the form of a closed slot 28 that is dimensioned to receive the strap 22 of the saddlebag 16. The portion of the base 12 adjacent the slot includes a beveled edge 30 that facilitates insertion of the strap 22 into the slot 28. A bottom opening 32 provides access between the recess 24 and the slot 28, and a lower opening 34 is provided in alignment with the bottom opening 32.

Referring to FIG. 7, the lock assembly 14 is dimensioned to fit in the recess 24. The lock assembly 14 can be secured in the recess 24 by a securing member 36 positioned through the side opening 26 and into the lock assembly 14. For example, the securing member 36 can be a rivet, set screw, or other appropriate securing device. The illustrated lock assembly 14 includes an engaging member in the form of a plunger 38 that is moveable relative to the base 12 between a locked position (broken lines in FIG. 7) and an unlocked position (solid lines in FIG. 7). Movement of the plunger 38 is performed using an appropriate key 40 (FIG. 2). For example, in the illustrated embodiment, the lock assembly 14 is a tubular lock, and movement of the plunger 38 is performed using a matching tubular key.

The saddlebag lock 10 further includes fingers 50 that define an open slot 52. The fingers are designed to engage a buckle loop 54 on the saddlebag 16. More specifically, the buckle loop 54 of the saddlebag 16 holds the buckle 23 in position, and is designed to be inserted into the open slot 52 so that the saddlebag lock 10 maintains engagement with the saddlebag 16 even when the saddlebag lock 10 is not engaged with the strap 22.

In operation, the saddlebag lock 10 is designed to be engaged with the buckle loop 23 of the saddlebag 16 before the strap 22 has been inserted through the buckle 23 (FIG. 1). The strap 22 is then inserted through the buckle 23 and through the closed slot 28. With the strap 22 properly buckled, the saddlebag lock 10 should be positioned approximately at the second hole below the buckle 23. The key is then inserted into the lock assembly 14 and rotated, thereby causing the plunger 38 to insert through a hole in the strap 22 and into the lower opening 34. The key is then removed, thereby locking the saddlebag lock 10 to the strap 22. Because the saddlebag lock 10 is larger than the buckle, the strap 22 cannot be pulled through the buckle.

An alternative embodiment of the present invention is illustrated in FIG. 8. In this embodiment, the fingers of the previous embodiment have been replaced by a tongue that is riveted to the saddlebag 16. This design results in a more secure relationship between the saddlebag lock 10 and the saddlebag 16. However, this design will require permanent modifications to the saddlebag 16 (e.g., insertion of a rivet through the saddlebag 16).

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle saddlebag comprising:

a saddlebag body having an opening;

a saddlebag lid coupled to said body and movable relative to said body between an open position and a closed position;

a strap interconnecting said lid to said body, said strap being movable from a strapped position to an unstrapped position, said strap having a free end and an opposite end attached to one of said body and said lid, said strap also including a plurality of holes;

a retaining member attached to the other of said body and said lid and defining an opening through which said strap is received when in the strapped position; and a lock that is separate and distinct from said retaining member and that is larger than said retaining member such that said lock may not pass through said retaining member, said lock including an engaging member movable from an unlocked position to a locked position where said engaging member may be extended through one of said holes in said strap only on the portion of said strap between said free end and said retaining member to couple said lock and said portion of said strap such that said free end of said strap may not be pulled through said retaining member.

2. A motorcycle saddlebag as claimed in claim 1, wherein said retaining member comprises a buckle adapted to engage one of said holes in said strap.

3. A motorcycle saddlebag as claimed in claim 2, wherein said buckle is attached to the other of said body and lid by a buckle strap, and wherein said lock is attached to said buckle strap.

4. A motorcycle saddlebag as claimed in claim 1, wherein said lock is detachably secured to said other of said body and said lid.

5. A motorcycle saddlebag lock for locking a saddlebag having a body, a lid, a strap connected to one of the lid and the body, and a retaining member connected by a connecting member to the other of the body and the lid, wherein the strap and retaining member connect the body to the lid, said lock comprising:

a base having an opening adapted to receive the strap;

fingers defining a open slot adapted to receive the connecting member, said fingers permitting movement of said lock along the connecting member and with respect to the retaining member; and an engaging member coupled to said base and movable relative to said base between an unlocked position out of said opening and a locked position in said opening.

6. A motorcycle saddlebag lock as claimed in claim 5, wherein said opening is a closed slot having a center, and wherein said engaging member is positioned at said center of said closed slot.

7. A motorcycle saddlebag lock as claimed in claim 5, wherein said engaging member is coupled to a locking mechanism that allows movement of said engaging member only with the use of a key.

8. A motorcycle saddlebag lock as claimed in claim 5, wherein said engaging member moves linearly when moving between said locked and unlocked positions.

9. A method of locking a motorcycle saddlebag having a body, a lid, a strap connected to one of the body and the lid and having a plurality of holes, and a retaining member connected with a connecting member to the other of the body and the lid, said method comprising the steps of:

providing a lock that is separate and distinct from the retaining member, wherein the lock includes a slot adapted to receive the strap and an engaging member movable to engage and disengage one of the holes in the strap;

releasably mounting the lock on the connecting member;

closing the lid;

inserting a portion of the strap through the retaining member such that an end portion of the strap extends beyond the retaining member;

inserting the end portion of the strap through the slot of the lock; securing the lock to the end portion of the strap by inserting the engaging member through a hole in the end portion of the strap only; and inhibiting removal of the strap from the retaining member due to the lock being larger than the retaining member.

10. A method of locking a motorcycle saddlebag as claimed in claim 9, wherein the retaining member comprises a buckle, and wherein said inserting a portion of the strap through the retaining member step includes buckling the strap to the buckle.

11. A motorcycle saddlebag as claimed in claim 1, wherein said retaining member is attached to the other of said body and said lid by a connecting member, and wherein the lock includes fingers that define a first open slot, and wherein said first slot releasably receives said connecting member.

12. A motorcycle saddlebag as claimed in claim 11, wherein said lock includes a second slot spaced from said first slot, wherein said second slot releasably receives said free end of said strap.

13. A motorcycle saddlebag lock as claimed in claim 5, wherein said connecting member is a buckle loop.

14. A motorcycle saddlebag lock as claimed in claim 5, wherein said retaining member is a buckle.

15. A method of locking a motorcycle saddlebag as claimed in claim 9, wherein the lock includes an open slot, and wherein the releasably mounting step includes positioning the connecting member in the open slot.

\* \* \* \* \*